United States Patent
Dillon et al.

(10) Patent No.: US 6,546,488 B2
(45) Date of Patent: *Apr. 8, 2003

(54) BROADCAST DELIVERY OF INFORMATION TO A PERSONAL COMPUTER FOR LOCAL STORAGE AND ACCESS

(75) Inventors: Douglas M. Dillon, Gaithersburg, MD (US); Glenn D. Robins, Montgomery Village, MD (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,896

(22) Filed: Sep. 21, 1998

(65) Prior Publication Data

US 2002/0059526 A1 May 16, 2002

Related U.S. Application Data

(60) Provisional application No. 60/059,474, filed on Sep. 22, 1997.

(51) Int. Cl.[7] ................................................ H04L 9/00
(52) U.S. Cl. ........................ 713/181; 340/7.48; 709/204
(58) Field of Search ............................... 713/200, 201, 713/202, 163, 161, 162, 181; 707/1, 7, 9, 10; 709/202, 226, 229, 232, 217, 204–206; 340/7.48, 7.46; 705/14

(56) References Cited

U.S. PATENT DOCUMENTS 5,155,591 A * 10/1992 Wachob ........................ 725/35
5,202,981 A * 4/1993 Shackelford .................. 707/1

(List continued on next page.)

OTHER PUBLICATIONS

"Re: NNTP News Feed Wanted", Gillaspie N, Usenet Newsgroup News. Admin. Misc Retrieved From the Internet, Apr. 6, 1996.

"Netnews at 115Kbps via Satellite", Gillaspie N., Usenet Newsgroup News Admin. Misc. Retrieved From the Internet, Nov. 4, 1995.

(List continued on next page.)

Primary Examiner—Gail Hayes
Assistant Examiner—Christopher Revak
(74) Attorney, Agent, or Firm—John T. Whelan; Michael Sales

(57) ABSTRACT

A method and apparatus for broadcasting newsgroup information to a plurality of users uses a news server, which is in communication with the Internet, a newscast transmitter, a satellite gateway, and a subscriber station. The news server gathers newsgroup information from Internet newsgroups, and the newscast transmitter, in conjunction with the satellite gateway and a satellite, distributes all of the information to a plurality of subscriber stations. The subscriber stations preferably include personal computers equipped to receive broadcast newsgroup information. The subscriber stations each include a personal news server, storage media and a newsreader. The personal news server filters newsgroup information received based on subscription information stored only local to the receiver. The filtered newsgroup information is stored on the storage media for use at a later time when a user desires to read the newsgroup information.

14 Claims, 9 Drawing Sheets

U.S. PATENT DOCUMENTS

| | | | | |
|---|---|---|---|---|
| 5,517,494 A | * | 5/1996 | Green | 370/60 |
| 5,710,884 A | * | 1/1998 | Dedrick | 719/217 |
| 5,717,923 A | * | 2/1998 | Dedrick | 707/102 |
| 5,740,549 A | * | 4/1998 | Reilly et al. | 705/14 |
| 5,761,662 A | * | 6/1998 | Dasan | 707/10 |
| 5,815,665 A | * | 9/1998 | Teper et al. | 709/229 |
| 5,852,721 A | * | 12/1998 | Dillon et al. | 709/217 |
| 5,920,701 A | * | 7/1999 | Miller et al. | 709/228 |
| 6,047,327 A | * | 4/2000 | Tso et al. | 709/232 |
| 6,122,483 A | * | 9/2000 | Lo et al. | 455/12.1 |
| 6,185,599 B1 | * | 2/2001 | Salimando et al. | 709/202 |
| 6,210,691 B1 | * | 4/2001 | Youn | 709/200 |
| 6,337,911 B1 | * | 1/2002 | Dillon | 380/262 |
| 6,351,467 B1 | * | 2/2002 | Dillon | 370/432 |
| 6,460,036 B1 | * | 10/2002 | Herz | 707/10 |

OTHER PUBLICATIONS

"Multimedia Services and Data Broadcasting Via Satellite", Arcidiacona A., Electronics and Communication Engineering Journal, vol. 9, No. 1, Feb. 1997, pp 33–37.

"The Application of Digital Broadcast Communication to Large Scale Information Systems", Gifford D. K. et al., IEEE Journal on Selected Areas in Communications, vol. SAC–03, No. 3, May 1985, pp. 457–467.

"Re: active file", Jasper D., Usenet Newsgroup Biz. Pagesat Retrieved From the Internet, Jun. 2, 1995.

"Urgent Urgent LS Encryption" Gillaspei N, Usenet Newsgroup Biz. Pagesat Retrieved from the Internet, May 27, 1996.

"Re: Am I Missing Pieces?", Henke D. G., Usenet Newsgroup Alt.Fairs.Renaissance, Mar. 14, 1997.

"An Authentication Mechanism For Usenet", Bishop M, Proceedings of the Winter Usenix Conference, 1991, pp. 281–287.

Tanenbaum, "Computer Networks," 1996, Prentice Hall PTR, Third Edition, p. 8,37,182–190,542.*

Radatz et al, "The IEEE Standard Dictionary of Electrical and Electronics Terms," Dec. 1996, Institute of Electrical and Electronics Engineers, Inc., Sixth Edition, p. 479.*

Skrinde, "Enter Oracle 7: the debut of Oracle's "cooperative server" technology for transparent access to data". Aug. 1992, DBMS, vol. 5, #9, courtesy of dialog text search, p. 68–72.*

Templeton, "On multicasting USENET" Aug. 19, 1998, www.landfield.com/userfor/1998/Aug./0401.html, p. 1–3.*

Gschwind et al, "NewsCache—A High Performance Cache Implementation for Usenet News" 1999, Proceedings of the USENIX Annual Technical Conference, p. 1–3.*

Gschwind et al, "A Cache Architecture for Modernizing the Usenet Infrastructure" 1999, www.infosys.tuwein.ac.at/NewsCache/doc/hicss32/, p. 1–17.*

* cited by examiner

BROADCAST DELIVERY OF INFORMATION TO A PERSONAL COMPUTER FOR LOCAL STORAGE AND ACCESS

RELATED APPLICATIONS

This application claims priority from U.S. Provisional Application Ser. No. 60/059,474, filed Sep. 22, 1997. This application is related to allowed U.S. application Ser. No. 08/797,505, which is now U.S. Pat. No. 5,852,721, filed Feb. 7, 1997, entitled "Method and Apparatus for Requesting and Retrieving Information from a Source Computer Using Terrestrial and Satellite Interfaces," which is a continuation-in-part of U.S. application Ser. No. 08/257,670, which is now abandoned, filed Jun. 8, 1994. The contents of U.S. application Ser. No. 08/797,505 which is now U.S. Pat. No. 5,852,721, are incorporated herein by reference.

BACKGROUND OF THE INVENTION (a) Field of the Invention

The present invention relates generally to data delivery and, more particularly, to a method and apparatus for delivering Internet newsgroup information over a broadcast network.

(b) Description of Related Art

Internet newsgroup services are known. Network news started as mailing lists on the ARPANET and then grew into the Usenet news system. As will be apparent to those skilled in the art Usenet is a news service (see e.g., www.interactive.net/netnews). Mailing lists are still popular today, but in terms of sheer volume, network news has grown rapidly over the past decade.

Usenet is not a physical network, but a logical network implemented on top of many different types of physical networks. Years ago the popular way to exchange network news on Usenet was with dial-up phone lines (normally during off-peak hours to save money), however, today the Internet is the basis for most news distribution.

The Usenet news system supports thousands of different newsgroups. Each newsgroup is identified by a newsgroup name that identifies the topic of discussion carried on the newsgroup. Newsgroups are available for a vast array of different topics ranging from business and technology to cooking. Newsgroups also cover a-variety of controversial topics. Accordingly, a user may strongly desire to keep private, the newsgroups he or she has accessed. A user may post an article to one or more newsgroups. The article is then distributed to news servers throughout the Internet so it can be accessed by other users. An article is a text message often with attachments such as pictures, audio segments or some other binary data. Articles without attachments are typically less than 10,000 bytes in length. However, articles with attachments may range between 20,000 and 80,000 bytes in length. As of September 1998, the Usenet news system carries 10,000 to 15,000 MB of new articles every day. These articles are posted to roughly 30,000 different newsgroups. This is equivalent to more than 1.5 Mbps of new articles per day, on average.

FIG. 1 is an overview of a typical news setup. An Internet Service Provider (ISP) configures one host as the ISP's news server and stores all recently posted news articles locally. News servers are organized into a logical network across the Internet, feeding news articles to each other. The Network News Transfer Protocol (NNTP) is used for communication between news servers. NNTP is an application protocol, as described in Request for Comment (RFC) 977, used for the distribution, inquiry, retrieval, and posting of news articles using a reliable stream-based protocol, such as Transmission Control Protocol (TCP). TCP is described in RFC 793. News articles use various header fields as documented in RFC 1036. News servers may be implemented in various ways, for example, InterNetNews (INN) is a popular UNIX news server application.

An ISP's subscribers, often Personal Computers (PCs) having dial-up connections into the Internet, access the news server to read news articles and post new articles to selected newsgroups. Subscribers use "news clients" or "newsreaders" to communicate with the news server, via NNTP. Many news clients, such as Microsoft Internet News™, Microsoft Outlook Express™ and Netscape Communicator's Collabra™ application are commercially available. Each news client presents a different user interface, similar to the multitude of different user interfaces presented by various email client programs. News clients interact with the newsgroup server to:

1. Retrieve the list of newsgroups maintained by the news server.
2. Retrieve the titles of articles within the news server posted to a specific newsgroup.
3. Retrieve all the articles posted to a specific newsgroup.
4. Post an article to one or more newsgroups.

A news client often allows a user to "subscribe" to one or more newsgroups. The news client then automatically downloads any new articles from the subscribed-to newsgroups, thereby allowing the downloaded articles to be viewed later, perhaps when the user is not connected to the Internet. All news clients use NNTP to communicate with the news servers.

News servers are organized into a "store and forward" network. When a client posts an article, a news server stores a copy and forwards the article to a configurable set of news servers. These news servers, upon receiving an article from another news server, store a copy if the article was not previously stored and forward the article to other news servers so that eventually an article is forwarded to all news servers. Using the store and forward technique ensures that an article will be forwarded to all news servers on the Internet that are interested in storing newsgroups to which the article was posted.

As previously noted, newsgroup articles may be quite large. When the user subscribes to many newsgroups or to newsgroups where the articles typically have large attachments, it may take a user a long time to download articles to the user's PC from the news server. This is inconvenient to a user as he/she must wait to access and read the articles. Additionally, each subscriber's newsgroup subscriptions must be communicated to that subscriber's ISP, thereby eliminating the privacy of newsgroup subscriptions.

SUMMARY OF THE INVENTION

The present invention is embodied in an apparatus and method for providing newsgroup information to a plurality of users. The present invention includes a transmitter for receiving the newsgroup information from one or more servers and for formatting the newsgroup information into newsgroup packets for multicast over a multicast network such as a digital geosynchronous satellite IP multicast system.

In an another embodiment, the present invention includes a personal news server for receiving and processing multicast newsgroup packets to recover newsgroup information and storage media for storing the newsgroup information.

In another embodiment, the present invention includes a downstream news server for receiving and processing multicast newsgroup packets and to make the stored newsgroup articles available to clients via a network interface.

The present invention may also be embodied in an apparatus for receiving newsgroup packets and relaying them to one or more servers according to the NNTP protocol, such invention including a Usenet relay server for receiving and processing multicast newsgroup packets to recover newsgroup information, storage media for storing the newsgroup information, and a network interface for relaying the newsgroup information to the news servers.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
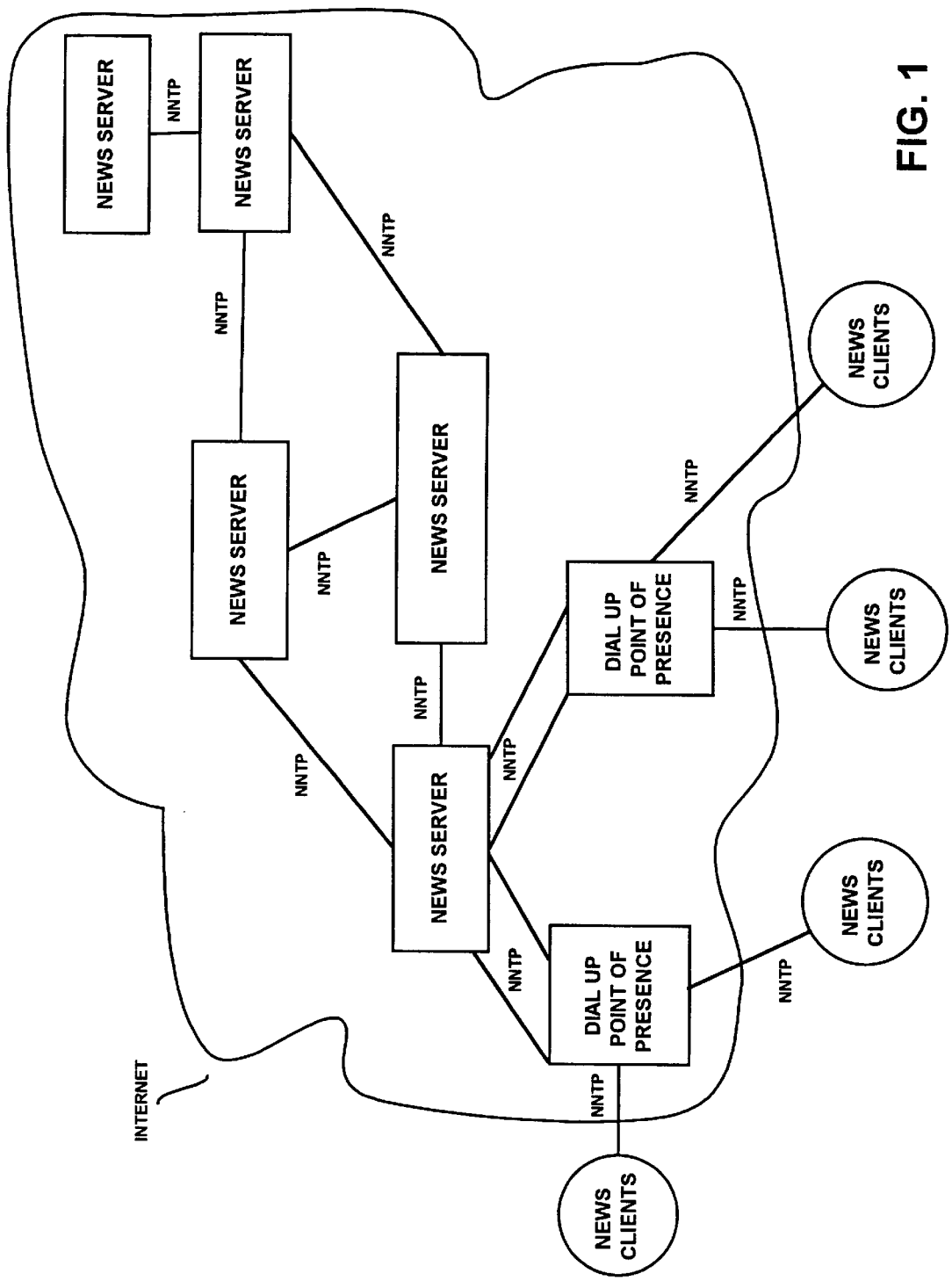
FIG. 1 illustrates a typical news network configuration.
Figure 2:
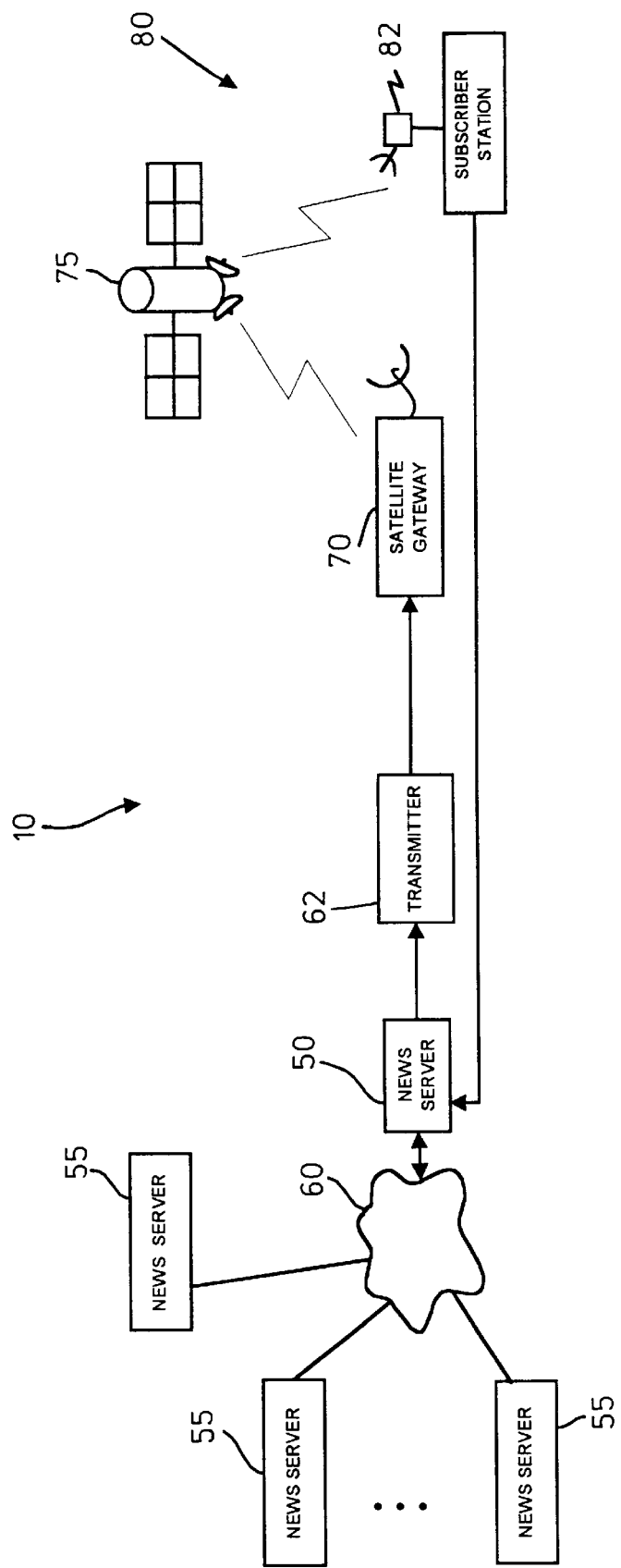
FIG. 2 illustrates a communication system employing the present invention.

FIG. 2 is a block diagram of a communication system 10 employing the method and apparatus of the present invention. The system 10 includes a news server 50 in communication with one or other news servers 55 via a network 60 (e.g., the Internet), a newscast transmitter 62, a satellite gateway 70, a geosynchronous satellite 75, and a subscriber station 80. News server 50 and news servers 55 may be identical hardware components and are referred to using different reference numerals for convenience in description of the present invention. In accordance with the present invention, the subscriber station 80 preferably includes an antenna/satellite dish for receiving multicast signals broadcast from the satellite 75 and a satellite receiver 82 for demodulating the satellite signal and reconstituting the multicast packets. The receiver station 80 also preferably includes a personal computer having input and output devices, a display monitor, and a keyboard. In one embodiment, the satellite receiver passes multicast packets to the personal computer via an Ethernet local area network (LAN). The DirecPC™ Enterprise Relay, a product manufactured and sold by Hughes Network Systems, a Hughes Electronics Company, is an example of such a receiver. In another embodiment, the satellite receiver passes multicast packets to the personal computer across a Universal Serial Bus. The DirecPC™ USB receiver, also manufactured and sold by Hughes Network Systems, is an example of such a satellite receiver. The multicast packets may also be passed to the personal computer in any of a variety of suitable methods, as will be apparent to one of ordinary skill in the art.

In accordance with the operation of the system 10 of the present invention, a user at the subscriber station 80 selects the newsgroups to which he or she wants to subscribe. These selections are retained locally in the subscriber station 80 and not transferred to the news server 50. The news server 50 receives all available newsgroup articles and the list of available newsgroups from other news servers 55, via the Internet. This information is transferred to the news server 50 regardless of whether any of the subscriber stations 80 have selected to receive the obtained newsgroup information. It is necessary for the news server 50 to obtain all newsgroup information because, in accordance with the present invention, the news server does not have knowledge of each user's subscriptions. Newsgroup information is broadcast via satellite or other high-speed multicast-capable data network, and received by the subscriber station 80. Although only one subscriber station is shown in FIG. 2, the system 10 generally includes a large number of subscriber stations at geographically remote locations. All newsgroup information is broadcast to all subscriber stations. As will be described in further detail, the subscriber station 80 filters the broadcast newsgroup information and only retains the list of newsgroups available and articles posted to newsgroups to which the user has subscribed.

The news server 50 typically receives newsgroup information from other news servers 55 via the network 60, as described earlier. This information consists of the list of newsgroups available from these news servers and recently posted articles. As the news server 50 acquires new articles, it forwards these articles to the transmitter 62. The transmitter 62 formats the newsgroup articles in a manner that is appropriate for transmission by a satellite gateway 70. Formatting may include grouping one or more articles into a group and then fragmenting the group of articles into multiple multicast User Datagram Protocol (UDP) packets having sufficient information for a receiver to reconstitute the articles from the packets while enabling the receiver to detect lost or damaged packets. This information is required since UDP is a transaction-oriented protocol that does not guarantee reliable delivery, as described in RFC 768.

In one embodiment, articles are multicast by the transmitter 62 in such a way that receiver processing is minimized by allowing most packets to be filtered based on their multicast address. Articles are grouped together into chunks, which are approximately 400 Kbytes in length. As used to herein, a "chunk" refers to a group of one or more articles that are processed together. Preferably, a chunk of articles is multicast as a series of multicast UDP packets where each packet contains a header field followed by a portion of the chunk of articles and where the header field contains subfields identifying, for example:

1. The chunk being transmitted. Every chunk should be uniquely identified by a rollover sequence number.
2. The total length of the chunk in bytes.
3. The length of data within this UDP packet.
4. The offset within the chunk of the first byte within the packet.

Of course, the header field may contain more or less information than identified above. This method of packetizing chunks of articles allows the receiver to determine when it has received sufficient packets to reassemble the chunk, to determine if packets have been lost or corrupted and to reassemble the chunk from the original packets.

For each chunk, the transmitter also formats a broadcast announcement that identifies the newsgroups to which articles in the chunk have been posted. The broadcast announcement also identifies the multicast address to which the chunk's packets will be addressed. In the preferred embodiment, the broadcast announcement contains a bit array of 40,000 bits. Each newsgroup name to which an article in the chunk has been posted is passed through a hash function that produces a number between 0 and 39,999. Hash functions are described in detail in *Art of Computer Programming*, Donald R. Knuth, Vol 1.3, Addison & Wesley, which is incorporated herein by reference. A bit in the broadcast announcement bit array is set only if one of the posted newsgroup names hashes to the array index of that bit. For example, if one of the articles is posted to alt.rec.sports.orioles and alt.rec.sports.orioles hashes to 15,384 then the $15,384^{th\ bit}$ in the array will be set to 1. This bit array allows a receiver to quickly determine whether an article posted to a subscribed-to newsgroup may be present within the chunk.

In the preferred embodiment, the bit array is typically a sparse matrix and is compressed using run length encoding prior to transmission. Various data compression techniques, including run-length encoding are disclosed in *Data Compression,* 3rd Edition, Gilbert Held. Without run length encoding the broadcast announcement consume roughly $\frac{1}{80}^{th}$ of the overall network capacity required to carry the articles themselves. Run length encoding reduces network consumption by broadcast announcements by up to $\frac{1}{1000}^{th}$ of the network capacity.

In a preferred embodiment, the broadcast announcements are multicast on a single multicast address, which all subscriber stations 80 access. The broadcast announcement is sent out before the chunk of articles so that the subscriber station 80 can process the broadcast announcement and open the multicast address to which that the chunk is being multicast. Additionally, the list of available newsgroups is periodically, for example once every 20 minutes, fragmented into packets and multicast on the broadcast announcement multicast address between broadcast announcements.

Preferably, the chunks themselves are multicast in a "round-robin" manner over a set of four different multicast addresses. For example, the first chunk might be multicast over 224.0.0.80, the next over 224.0.0.81, the next over 224.0.0.82, the next over 224.0.0.83 and then the next back to 224.0.0.80. This ensures that when a receiver processes a broadcast announcement and opens a multicast address, the receiver will only receive packets from the desired chunk. Alternatively, the chunk may be multicast in other manners as will be apparent to those skilled in the art.

Newsgroup packets created by the transmitter 62 are passed to the satellite gateway 70. The satellite gateway 70 is capable of handling any kind of data for broadcast. For example, the satellite gateway 70 may handle the broadcast of conditional access information or digitized audio and video in addition to the newsgroup packets generated by the transmitter 62. The satellite gateway 70 also sets the priority of information that is to be broadcast. Essentially, satellite gateway 70 functions as a multiplexer for all information that is to be broadcast. Additionally, the satellite gateway 70 may perform the functions of encrypting the data to be broadcast.

The satellite gateway 70 also FEC encodes and modulates the multiplexed data into an analog signal appropriate for satellite transmission by converting the signal's frequency and power level as is appropriate for transmission to a satellite 75. The multiplexed data stream including newsgroup packets from the satellite gateway 70 are transmitted to the satellite 75, which in turn re-broadcasts the stream to a plurality of subscriber stations 80, one of which is shown in FIG. 2.

Alternatively, newsgroup information may be broadcast via any high speed data network such as cable TV, optical link, and the like. The transmitter 62 is preferably programmed to broadcast newsgroup articles throughout the day. The newscast transmitter is scheduled to transmit articles at a maximum bit rate that varies for different times of the day and to store articles when the arrival rate of articles exceeds this capacity. This can be done, for example, to minimize the use of satellite capacity during busy times while scheduling the transmission of backlogged articles during less heavily loaded times.

The subscriber station 80 receives the multiplexed data stream including the packets from broadcast announcements, newsgroup chunks and the list of available newsgroups broadcast. However, a particular subscriber station may not need to acquire and store all of the newsgroup packets it receives. That is, unless a user subscribes to all newsgroups, all newsgroup packets need not be acquired.

The subscriber station 80 opens an address for broadcast announcements and processes all packets containing that address. The subscriber station thus periodically receives and reassembles the list of available newsgroups. The subscriber station also processes the broadcast announcements. Selective acquisition of newsgroup packets is performed by the subscriber station using multicast address filtering. That is, the subscriber station discards all packets except those addressed to "opened" addresses.

The subscriber station creates a subscribed-to bit array that it uses to evaluate broadcast announcements. The bit array has bits that correspond to the hashed value of each user subscribed-to newsgroup. If the result of "anding" together a broadcast announcement bit array with the subscribed-to bit array is all zeroes then the subscriber need not receive the announced chunk of articles. When the result is non-zero, the subscriber opens the multicast address for the chunk as the chunk probably contains one or more subscribed-to articles.

The subscriber station receives the packets for the chunk and, if all are received, reconstitutes the chunk of articles. The subscriber station then parses the header of each article within the chunk and only stores the article if it has been posted to one of the subscribed-to newsgroups. After processing a chunk, or detecting one or more lost packets, the subscriber station closes the chunk's address. For example, if the user of the subscriber station only subscribes to rec.animals.wildlife, the subscriber station 80 ignores all newsgroup articles not posted to that particular newsgroup. This method of operation allows subscriber anonymity because newsgroup information is filtered and stored based only on locally-stored subscription information.

Figure 3:
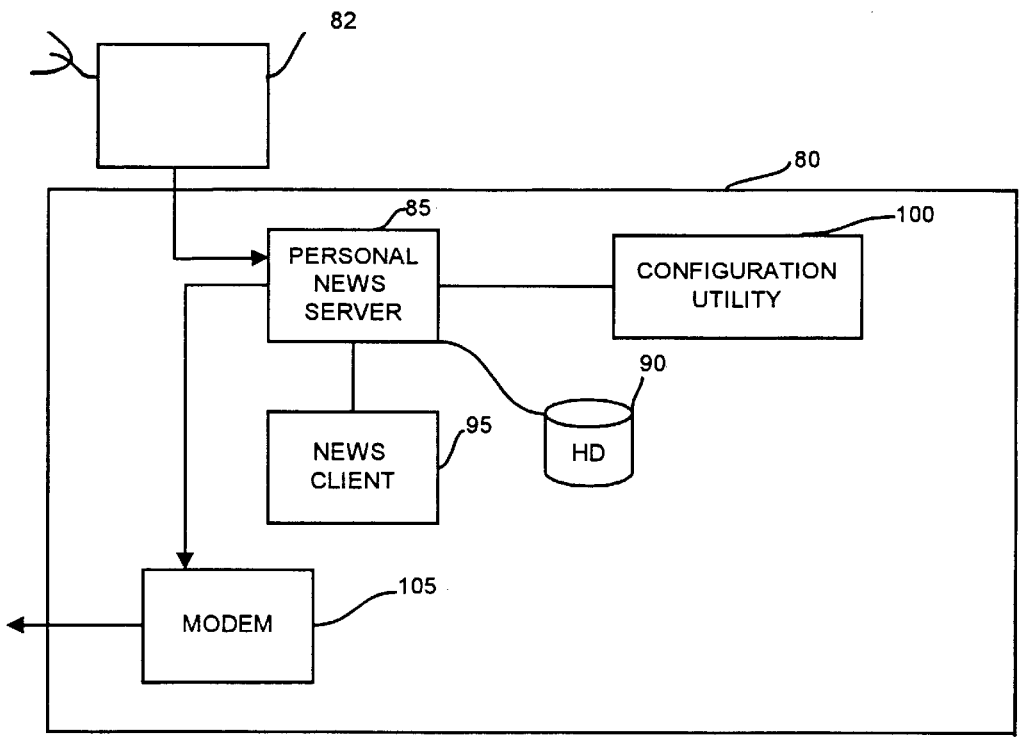
FIG. 3 is a more detailed illustration of the subscriber station shown in FIG. 2.

Referring to FIG. 3, a more detailed illustration of an embodiment of a subscriber station 80 is shown. The subscriber station 80 generally includes a satellite receiver 82, a computer running a personal news server (PNS) application 85, storage media such as a hard disk 90, a news client 95, a configuration utility 100, and a modem 105. The functionality of these components may be embodied in a personal computer equipped with a satellite receiver using software to perform hardware and data manipulations described herein.

The satellite receiver 82 receives the satellite signals and passes them to the PNS 85. Either the PNS 85 or the satellite receiver 82 may perform conditional access functions (e.g., decrypting) and decompression, if necessary, of the received encrypted newsgroup information. Conditional access functionality of the PNS 85 or satellite receiver 82 allows users who have been authorized by the satellite system operator to decrypt the data broadcast, while unauthorized users are prevented from decrypting and using the broadcast data.

The PNS 85 receives all of the newsgroup packets relayed by the satellite 75 that contain "opened" multicast addresses. As described earlier, the PNS 85 filters out everything except articles posted to subscribed-to newsgroups. This determination is made based on the list of newsgroups contained within the newsgroup articles and locally-stored subscription information. The newsgroup information for the desired newsgroups is stored on the hard disk 90 for later recall when the user desires to read the newsgroup information. The newsgroup articles not posted to the selected newsgroups are discarded by the PNS 85.

When the user wishes to read the newsgroup information, the user initiates a news client 95, which is configured to access the PNS 85, rather than a news server 50 located on the Internet. The PNS 85 allows the user to view the newsgroup information stored on the hard disk 90. The storage of newsgroup information on the hard disk 90 allows the user to access the newsgroup information quickly at hard disk speed, rather than at relatively slow network connection speed.

If a user wants to post newsgroup information to a particular newsgroup, he or she interacts with the news client 95 to post the article to the PNS 85. The PNS 85 is configured to re-post any articles it receives from the news client 95 to a news server 50 on the Internet 60. Posting may be done by enabling a modem connection to the Internet as needed. The news server 50 will distribute the article throughout the Internet and eventually the article will be multicast across the satellite and be processed and possibly stored by the subscriber station 80.

The subscriber station 80 includes a configuration utility 100 that allows the subscriber station user to set preferences and configure his/her newsreader as desired. The configuration utility may enable the user to: select newsgroups for subscription and/or unsubscription, configure password protection of newsgroup information, configure hard disk space allocated to the storage of newsgroup information, and specify a posting address for newsgroup information to be posted. In a preferred embodiment, the configuration utility 100 produces screen prompts that are displayed to the subscriber station user. Exemplary interface screens are shown in FIGS. 4–8.

Figure 4:
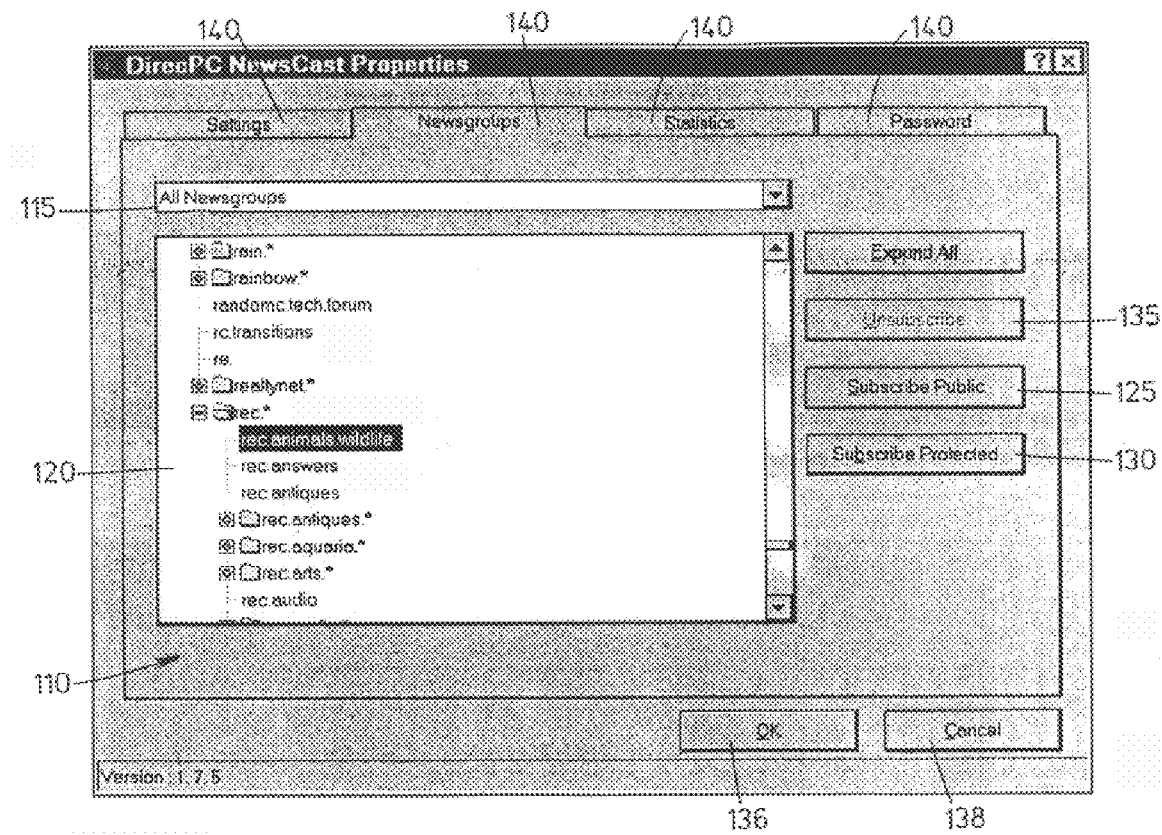
FIG. 4 illustrates one example of a user interface screen used to select different newsgroups in accordance with the present invention.

FIG. 4 is an example of an interface screen that enables a user to select newsgroups to which the user wants to subscribe or unsubscribe. The newsgroups interface 110 shown in FIG. 4 is created by a personal computer acting as a subscriber station 80. The personal computer is preferably at least a Pentium PC with 64 MB RAM, a DirecPC™ USB satellite receiver and enough available hard disk space to hold the subscriber-desired newsgroup information. The personal computer operating system may be based on Windows 98™, Windows 95™, Windows NT 4.0™ or any other suitable operating system. The software associated with the present invention is preferably built using Microsoft Visual C++ 4.2™ and the user interface is preferably created using Visual Basic 5.0™. Once the software associated with the present invention is built, it is compiled into an executable format that operates in conjunction with the personal computer's operating system and the stored newsgroup information to provide the functionality of the present invention (e.g., password protection of newsgroup information, selection of newsgroups for subscription, etc.)

The newsgroups interface 110 includes a pull down menu 115 that denotes the newsgroups shown in a newsgroup tree 120. The list of newsgroups is acquired by the news server 50, processed and multicast by the newscast transmitter 65 and broadcast via the satellite gateway 70. The subscriber station 80 receives the newsgroup list and displays the list as the newsgroup tree 120 shown in FIG. 4. Using conventional methods such as keyboard or mouse input, the user can select a newsgroup from the newsgroup tree 120 to which they want to subscribe (e.g., rec.animals.wildlife). Once a newsgroup is selected, a user may choose to subscribe with public access using a "subscribe public" menu button 125. Alternatively, a user may subscribe privately using a "subscribe protected" menu button 130. If public subscription is selected, the selected newsgroup is not password protected and may be read by anyone using the subscriber station 80. Conversely, the selection of "subscribe protected" makes the newsgroup information selection viewable only to those users who are aware of the appropriate password set by a user. Stored newsgroup information, whether subscribed to as protected or unprotected, is stored in an encrypted format in the subscriber unit 80.

Once newsgroup information is received and, if necessary, decrypted, it is stored in an encrypted format on the hard drive 90 in the subscriber unit 80. Encrypted storage of newsgroup information prevents unauthorized viewing of newsgroup information. The newsgroups interface 110 shown in FIG. 4 also provides the function of unsubscribing from newsgroups. This may be accomplished by selecting the newsgroup to which subscription is no longer desired and selecting the "unsubscribe" menu button 135. After the user makes his or her desired subscription and unsubscription selections, he or she may select "OK" 136 to exit out of the subscription interface. Alternatively, the user may click "Cancel" 138 to quit and not save the changes that were made.

In accordance with the present invention, the PNS 85 only stores a single copy of an article when that article is posted to more than one subscribed-to newsgroups. For example, if an article is posted to both the rec.animals.wildlife newsgroup and to the rec.animals.frogs newsgroup, the personal news server of a subscriber station that subscribes to both newsgroups will only store the article one time on the subscriber station's hard disk 90. A news client 95 will be able to access the article when accessing either of the two newsgroups. The ability to store redundant newsgroup information one time and provide multiple access to the information is possible through the use of an index file that indicates the newsgroup information as referenced by each newsgroup. When the user tries to access newsgroup information, the index file points to the location where the information is stored. If the user tries to access expired information, the index file will reflect this fact and notify the user that the newsgroup information requested is not available.

The user may utilize the configuration utility 100 to select other options for his/her subscriber station 80. Selection of other interfaces may be accomplished by various standard means such as keyboard commands or mouse clicks. Preferably, each set of options has a tab on a tabbed dialog box, when clicked, brings the selected set of options to the foreground of the viewing screen. As shown in FIGS. 4–8 tabs 140 are provided to enable the user to select alternate interfaces.

Figure 5:
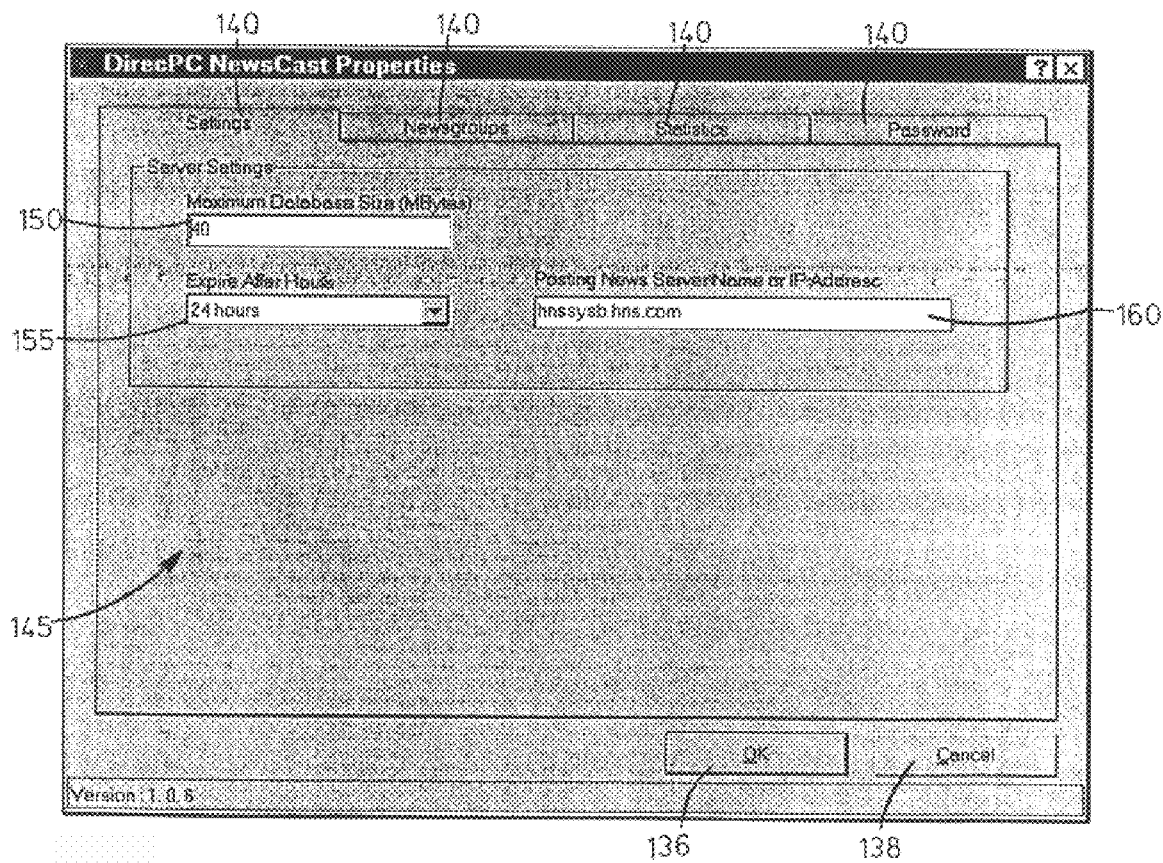
FIG. 5 illustrates one example of a user interface screen used to configure the news-gathering parameters of the present invention.

Referring now to FIG. 5, a settings tab 145 is shown. The settings interface 145 enables the user to select, for example, a maximum database size 150, expire after hours 155, and posting news service name or IP address 160. The maximum database size allows the user to specify the maximum hard disk space that newsgroup information may occupy in the subscriber station 80. This selection is preferably made in megabytes, but could be made in gigabytes or any other suitable increments. Expire after hours 155 is a field that allows the user to specify the rate at which newsgroup information on the hard disk becomes obsolete. That is, the expire after hours field 155 enables the user to specify a time period after which the newsgroup information on the hard disk may be deleted or archived. In a preferred embodiment, the expire after hours field 155 has a pull down menu that allows the user to specify some standard periods of time through a few simple mouse clicks. The posting news server name or IP address field 160 allows the user to specify a server name or IP address of the news server to which posted newsgroup articles should be sent.

Figure 6:
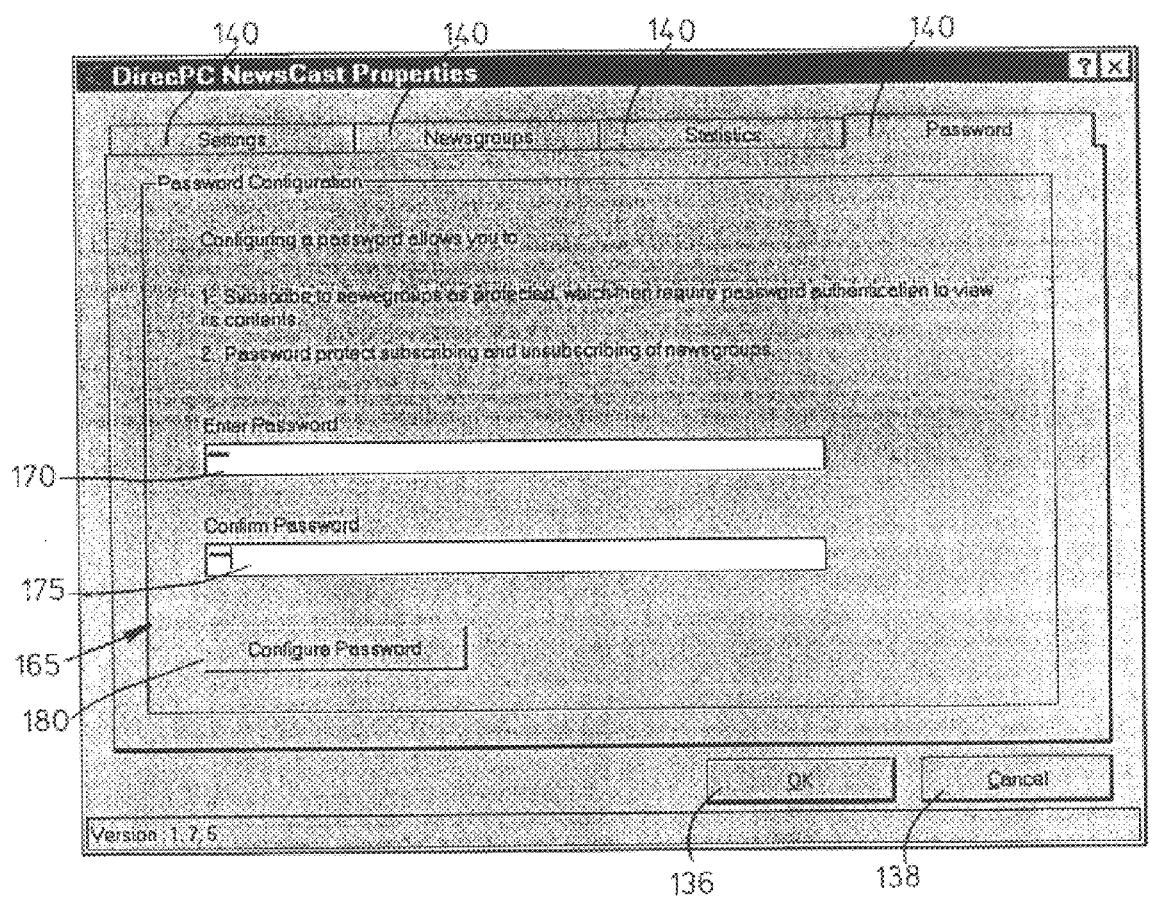
FIGS. 6 and 7 illustrate user interface screens used to configure the password protection features of the present invention.

FIG. 6 represents a password interface 165, which allows the user to enter a password that will be used to maintain security over newsgroup information that is subscribed to as protected. The password also allows protection of the subscribing and unsubscribing of newsgroups, thereby preventing unauthorized subscription and unsubscription of newsgroups. In a preferred embodiment, all newsgroups that are subscribed to are stored in the subscriber station in an encrypted format in the subscriber station to prevent unauthorized viewing of the newsgroup information. Additionally, the names of protected newsgroups are not shown as "subscribed to" in any portion of the user interface accessible without an appropriate password. The password interface 165 preferably includes an "Enter Password" field 170 and a "Confirm Password" field 175. These two fields allow a user to enter a password and confirm that the password they selected is the password that they entered. The password interface 165 also preferably includes at least a "Configure Password" button 180, which is used to set the password.

Figure 7:
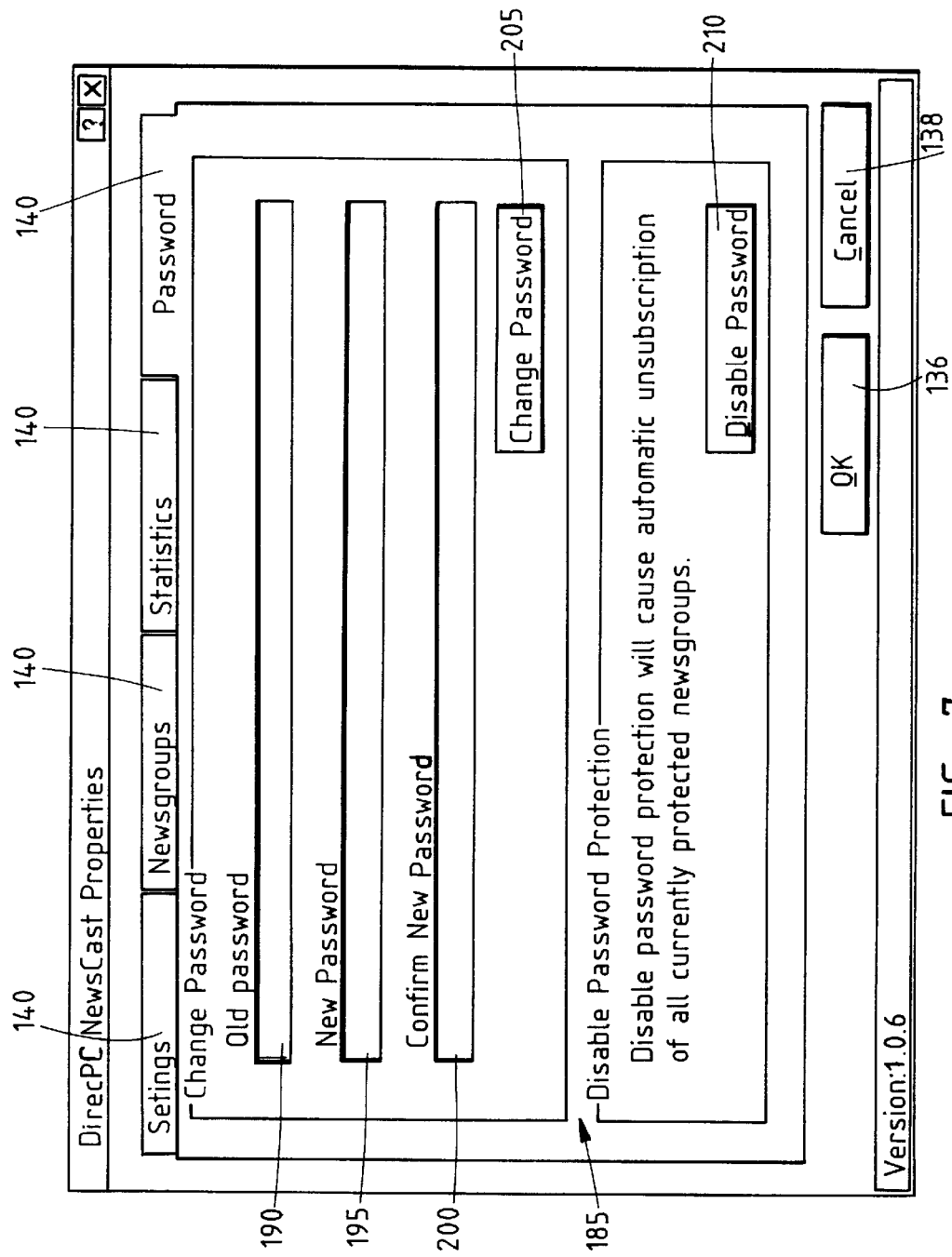
Figure 8:
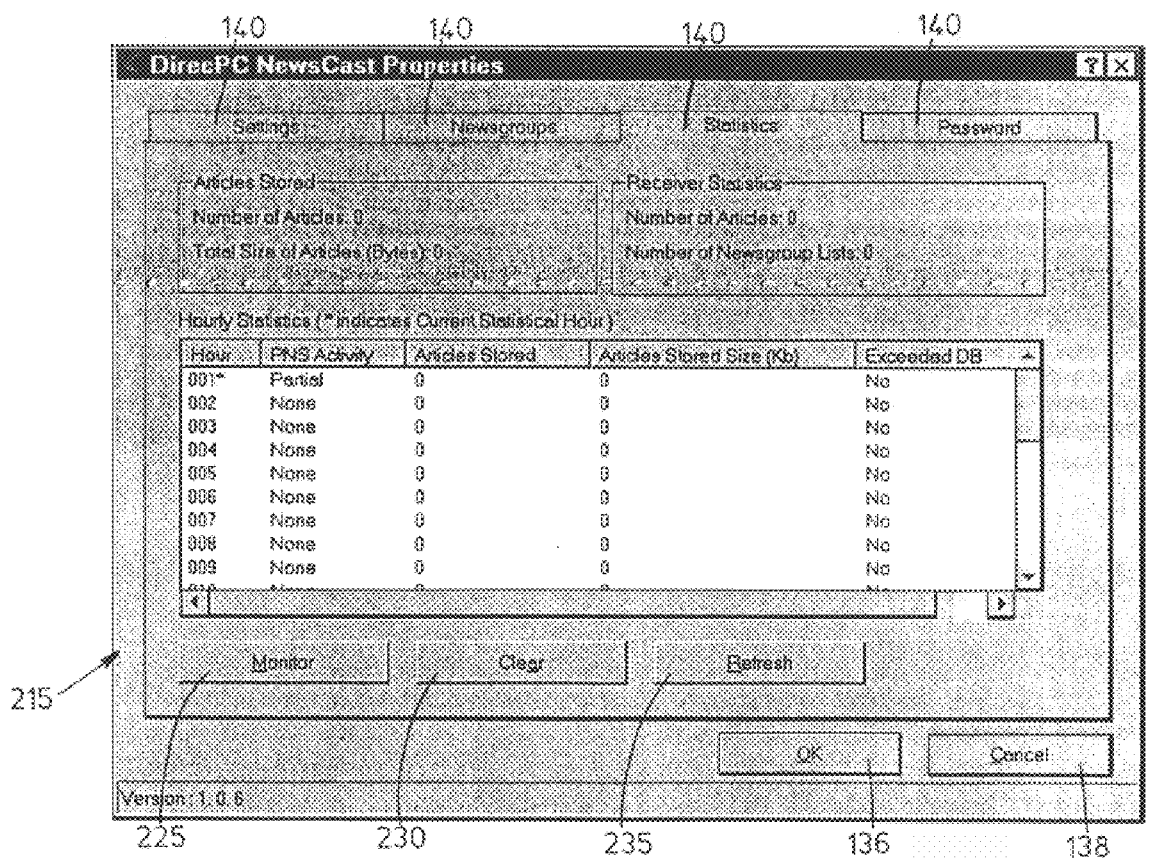
FIG. 8 illustrates a user interface screen that displays to a user various system statistics gathered in accordance with the present invention.

Once a password has been configured, another password interface may be provided. As shown in FIG. 7 a password interface 185 may be provided to enable users to change their password. The change password interface preferably includes an "Old Password" field 190, a "New Password" field 195, and a "Confirm New Password" field 200. When a user desires to change his or her password, he or she must enter the old password, the new password, and a confirmation that the new password was keyed in correctly. The change password interface 185 also, preferably, includes a "Change Password" button 205, which carries out the action of changing the password from the old password to the new password once all relevant information is entered in fields 190, 195, and 200. Additionally, a "Disable Password" button 210 is preferably provided to allow the user to automatically unsubscribe from all password protected newsgroup subscriptions. Password protection and configuration may be carried out by any standard method that is used in conjunction with a Windows™ environment.

Another tab on the tabbed dialog box that may be provided in accordance with the present invention is a statistics interface 215. The statistics interface 215 allows the user to monitor the activity of his/her subscriber station 80. Specifically, the statistics interface 215 allows the user to monitor how much newsgroup information stored, the amount of disk space occupied by the stored newsgroup information, and the activity of the personal news server.

The statistics interface may include "Monitor" 225, "Clear" 230, and "Refresh" 235 keys. The "Monitor" key 225 sets the configuration utility to monitor download statistics and refresh the statistics periodically (e.g., every 10 seconds). The "Refresh" key 235 commands the configuration utility to perform an instant refresh of the download statistics, as opposed to waiting for the monitoring process to update the statistics. The "Clear" key 230 clears all of the statistics shown in the statistics interface 215. Subsequent statistics, whether they are from the monitor function or the refresh function, will be output on the cleared statistics interface 215 after the "Clear" key is actuated. The information displayed in the statistics interface 215 is gathered by the personal news server 85 and stored on the hard disk 90. Software to perform the functionality of gathering the statistics and displaying them may be easily developed be persons of ordinary skill in the art.

Figure 9:
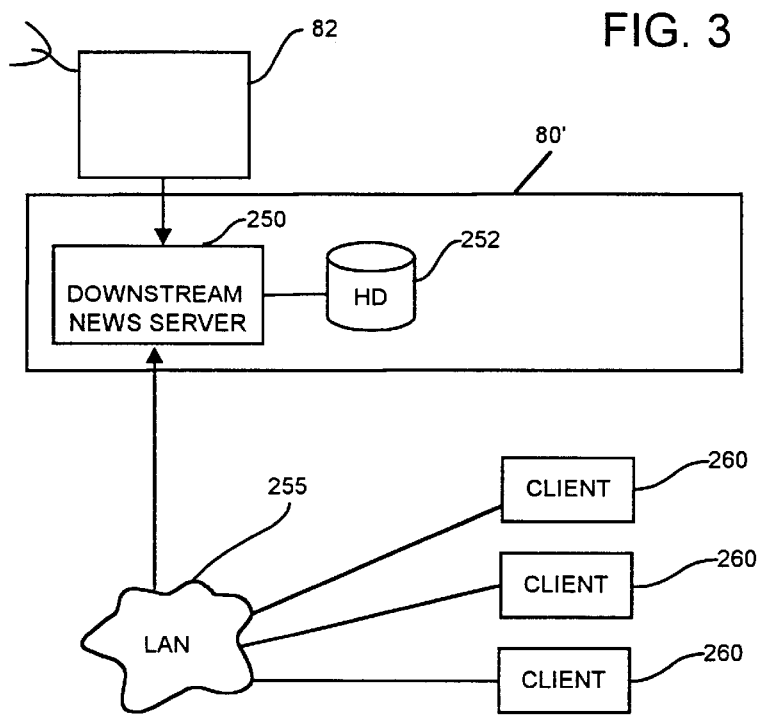
FIG. 9 is alternate embodiment of the subscriber station shown in FIG. 3.

FIG. 9 is an alternate embodiment of a subscriber station 80'. The subscriber station configuration shown in FIG. 9 may be implemented in an office-type environment. The subscriber station 80' includes a downstream news server 250, storage medium such as a hard disk 252, a local area network 255, and a plurality of clients 260. The downstream news server 250 receives and stores newsgroup information from the satellite 75 on the hard disk 252. The stored information is made available to clients via the NNTP protocol through the subscriber station's network interface. The clients 260, in addition to any other possible functions, present users with interface screens as described in conjunction with FIGS. 4–8. The subscriber station 80' eliminates the need for redundant satellite receiver hardware at each client 260 by operating as a news server for its clients while not requiring an expensive, high-speed connection to the Internet to obtain the articles.

The downstream news server 250 performs the functions of filtering the received newsgroup information and storing relevant newsgroup information to the hard disk 252 in the same way that the personal news server performs this function. Additionally, the downstream news server 250 may include hardware and/or software that performs conditional access decryption if the newsgroup information is broadcast in an encrypted format by the satellite gateway 70. The subscriber station 80' also includes a modem or other connection to the Internet that may be used to post newsgroup information to various newsgroups in a similar manner as previously described in conjunction with FIG. 3.

Figure 10:
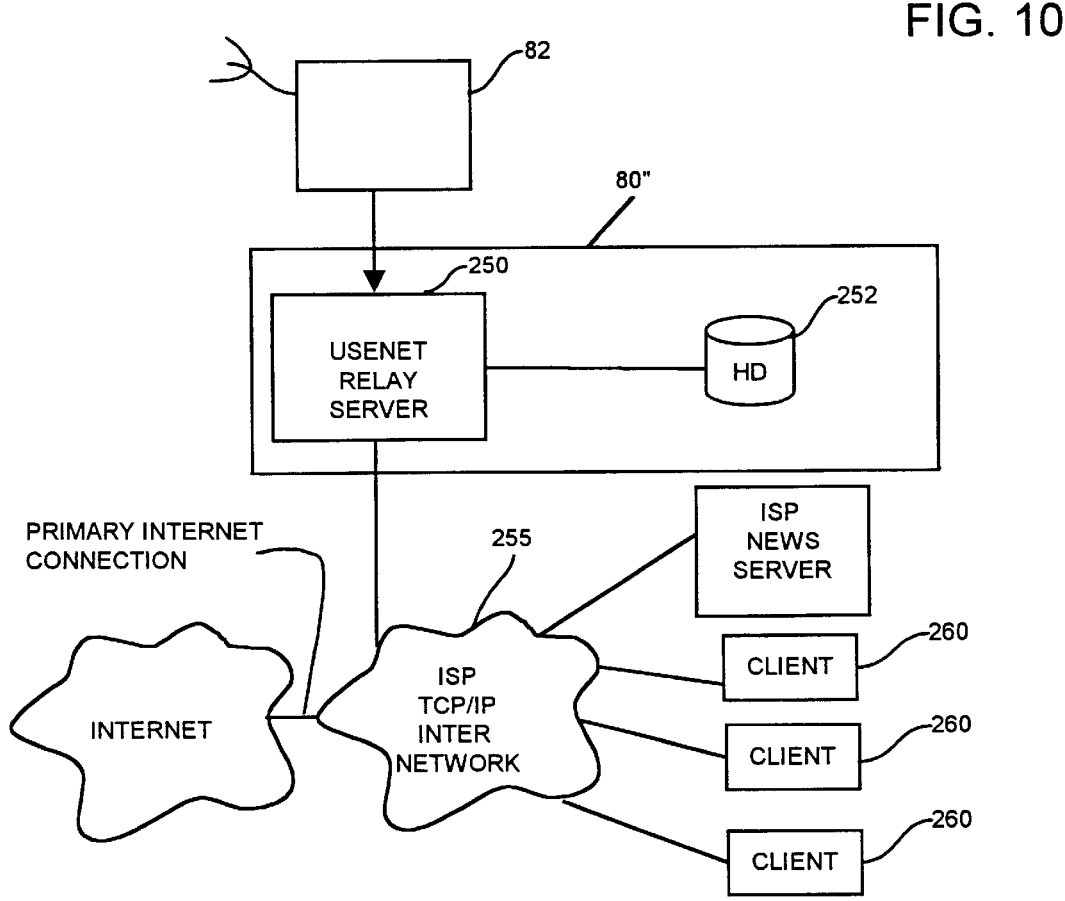
FIG. 10 is another alternate embodiment of the subscriber station shown in FIG. 3.

FIG. 10 is an alternate embodiment of a subscriber station 80". The subscriber station 80" shown in FIG. 10 may be implemented in an ISP environment to feed the ISP's news server without consuming bandwidth from the ISP's primary connection to the Internet. The subscriber station 80" includes a Usenet Relay server 250, storage medium such as a hard disk 252, a local area network 255, and a plurality of clients 260. The Usenet Relay server 250 receives and stores newsgroup information from the satellite 75 on the hard disk 252. The stored information is then sent to one or more downstream news servers according to the NNTP protocol in the same way articles are passed from one news server to another.

The Usenet relay server 250 performs the functions of filtering the received newsgroup information and storing relevant newsgroup information to the hard disk 252 in a similar way to that of the personal news server 85, except that in many cases all articles are stored, and that they are stored in a FIFO queue. The Usenet relay server de-queue articles from the queue and offers them to the ISP news servers according to the NNTP protocol holding the articles in the queue during any periods where the server may be unavailable. The Usenet relay server is not involved in postings as ISP news servers are configured to relay their postings to other news servers out in the Internet.

Of course, it should be understood that a range of changes and modifications can be made to the preferred embodiment described above. For example, application level filtering, rather than multicast address filtering could be used to filter out multicast articles not containing subscribed to articles. Broadcast announcements could use other methods beside the hash function based bit arrays to designate which newsgroups the articles within a chunk have been posted. In addition, the Personal News Server could create its list of subscribed to newsgroups automatically by examining the configuration of the various news clients within the subscriber terminal. In addition, a custom news client could be made which directly accesses the newsgroup articles from hard disk rather than going through the NNTP protocol to a personal News Server.

It is therefore intended that the foregoing detailed description be regarded as illustrative rather than limiting and that it be understood that it is the following claims, including all equivalents, which are intended to define the scope of this invention.

What is claimed is:

1. An apparatus comprising:
    a sending unit that is configured to send a newsgroup article using NNTP via an IP multicast network,
    wherein prior to sending the newsgroup article, said sending unit sends via the IP multicast network a message comprising (a) a multicast address to which the newsgroup article is to be addressed and (b) information related to information identifying a newsgroup to which the newsgroup article has been posted, the related information being used by a receiving apparatus in conjunction with newsgroup subscription information stored by the receiving apparatus to determine whether or not to open the multicast address to receive the newsgroup article,
    wherein the information identifying the newsgroup is the name of the newsgroup, and
    wherein the related information is determined by said sending unit by passing the name of the newsgroup through a hash function.

2. An apparatus according to claim 1, wherein the receiving apparatus is coupled to the IP multicast network via a satellite receiver connected to the receiving apparatus.

3. An apparatus according to claim 1, wherein said sending unit uses conditional access when sending the newsgroup article.

4. An apparatus according to claim 1, wherein said sending unit further sends via the IP multicast network and according to a schedule a list of newsgroups available for reception.

5. An apparatus according to claim 1, wherein said sending unit varies a rate of transmission based on a time of day.

6. A method comprising:
    a first step of IP multicasting via satellite a newsgroup article using NNTP; and
    a second step of IP multicasting via satellite, prior to said first step, a message comprising (1) a multicast address to which the newsgroup article is addressed and (2) information related to information identifying a newsgroup to which the article has been posted,
    wherein the information identifying the newsgroup is the name of the newsgroup, and
    wherein said second step comprises a step of determining the related information by passing the name of the newsgroup through a hash function, and
    wherein a receiving apparatus that receives the message uses the related information to determine whether or not to open the multicast address to receive the newsgroup article.

7. An apparatus comprising:
    a news server comprising (a) a receiving unit that is configured to receive a newsgroup article using NNTP via an P multicast network and (b) a message receiving unit that is configured to receive via the IP multicast network a message sent prior to sending of the newsgroup article, the message comprising (1) a multicast address to which the newsgroup article is to be addressed and (2) information related to information identifying a newsgroup to which the newsgroup article has been posted,
    wherein said receiving unit uses the related information and newsgroup subscription information stored by said news server to determine whether or not to open the multicast address in the message to receive the newsgroup article,
    wherein the information identifying the newsgroup is the name of the newsgroup, and
    wherein the related information is determined, by a sending apparatus that sends the message via the IP multicast network, by passing the name of the newsgroup through a hash function.

8. An apparatus according to claim 7, wherein said apparatus is coupled to the IP multicast network via a satellite receiver connected to said apparatus.

9. An apparatus according to claim 8, further comprising an NNTP client that is configured to obtain the newsgroup article from the news server.

10. An apparatus according to claim 8, wherein the newsgroup article is conditional access protected during transmission across the IP multicast network.

11. An apparatus according to claim 8, wherein the newsgroup subscription information is stored only locally to said news server.

12. An apparatus according to claim 8, further comprising a newsgroup list receiving unit that is configured to receive a list of newsgroups via the IP multicast network.

13. An apparatus according to claim 7, wherein said apparatus is coupled to plurality of NNTP clients via a local area network through which the NNTP clients communicate with said news server.

14. A method comprising:
    receiving an IP multicast message, the IP multicast message comprising (a) a multicast address and (b) information related to information identifying a newsgroup of a newsgroup article to be sent to the multicast address via IP multicast; and
    determining in accordance with the related information and newsgroup subscription information whether or not to open the multicast address to receive the newsgroup article,
    wherein the information identifying the newsgroup is the name of the newsgroup, and
    wherein the related information is determined, by a sending apparatus that sends the message via the IP multicast, by passing the name of the newsgroup through a hash function.

* * * * *